UNITED STATES PATENT OFFICE.

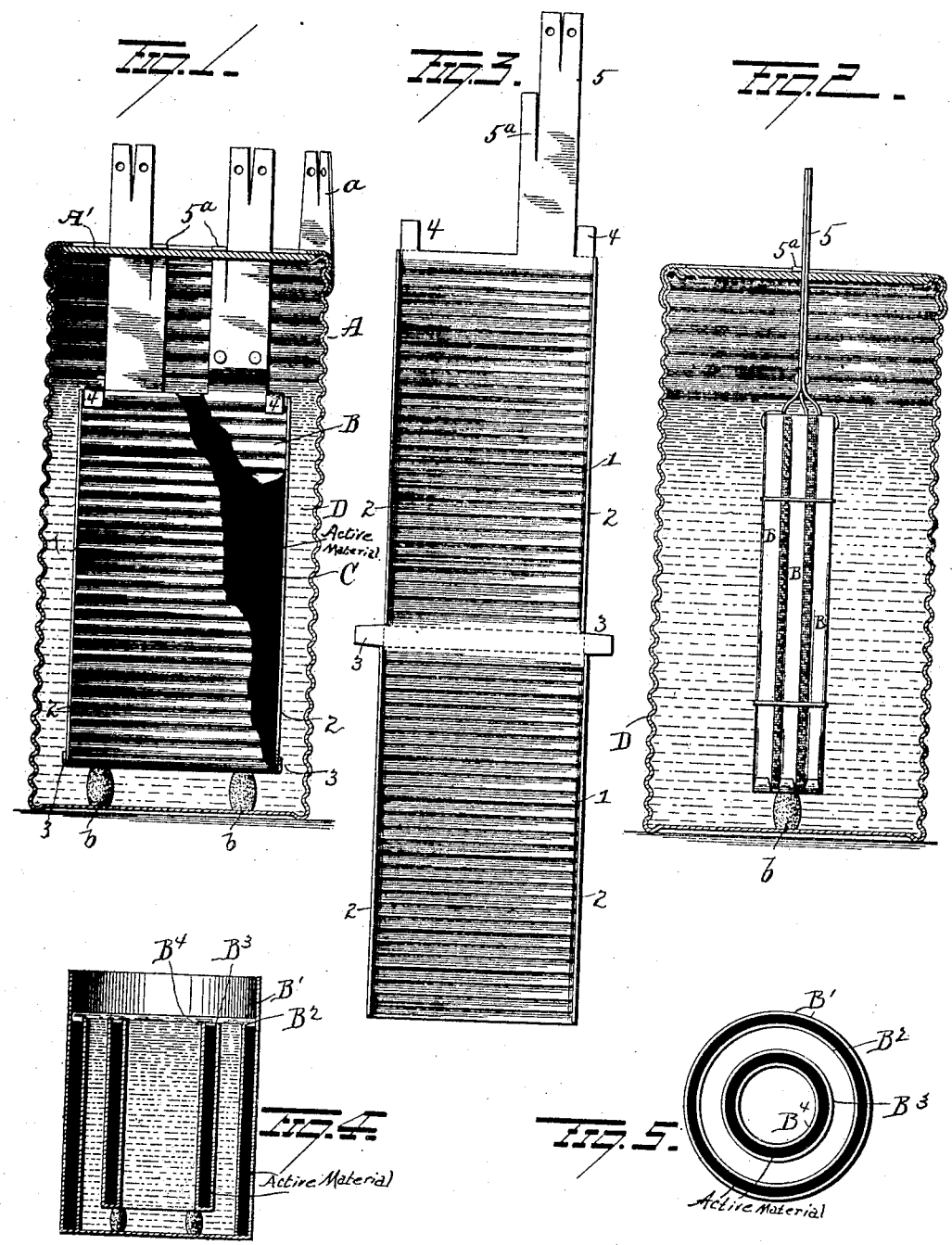

WILLIAM L. MERRIN, OF FREDERICKTOWN, OHIO.

STORAGE BATTERY.

No. 882,573.　　　　Specification of Letters Patent.　　　Patented March 24, 1908.

Application filed October 5, 1896. Serial No. 607,956.

*To all whom it may concern:*

Be it known that I, WILLIAM L. MERRIN, a resident of Fredericktown, in the county of Knox and State of Ohio, have invented certain new and useful Improvements in Storage Batteries; and I do hereby declare the following to be a full, clear, and exact description of the invention, such as will enable others skilled in the art to which it appertains to make and use the same.

My invention relates to an improvement in secondary or storage batteries.

It has heretofore been proposed and has been the common practice to construct electrodes for storage batteries of lead plates of numerous shapes and forms, some of which have been adapted to contain the active material.

One of the chief objections to the use of lead electrodes is their great weight and the consequent clumsiness of the batteries and the cost of handling them. Another difficulty incident to the use of lead electrodes is due to the inherent weakness of the metal in supporting itself in proper form and resisting pressures to which it is subjected, the latter characteristic being especially noticeable when the lead electrode is made in the form of a box adapted to contain the active material.

The object of my invention is to obviate the difficulties heretofore experienced and to construct a storage battery, the weight of which shall be reduced to a minimum.

A further object is to so construct a storage battery that the container of the active material of its electrodes will not be subjected to deterioration by the action of the electrolyte.

A further object is to reduce the cost of construction and maintenance of storage batteries to a minimum.

A further object is to construct a storage battery of material which can be readily and cheaply shaped to adapt the battery to the place or position which it is desired it shall occupy when in use.

A further object is to construct electrodes for secondary batteries of a material which shall be rigid, capable of maintaining any shape into which it may be formed, and which shall be light in weight and effectual in performing the functions required of it.

A further object is to produce an electrode for a storage battery of rigid structure and adapted to so contain and inclose the active material of the battery that the escape of said active material shall be rendered impossible.

A further object is to produce a secondary or storage battery which shall be compact, light, cheap and which shall be economical in the performance of its functions.

With these objects in view the invention consists in certain novel features of construction and combinations and arrangements of parts as hereinafter set forth and pointed out in the claims.

In the accompanying drawings, Figure 1 is a sectional view of my improved battery. Fig. 2 is a sectional view at right angles to Fig. 1. Fig. 3 is a view of a blank from which my improved hollow electrode is made. Figs. 4 and 5 are views of a modification.

A represents a cell, which is made of metal, preferably corrugated sheet iron and is adapted to serve the double office of a containing device or vessel and also one of the terminals of the battery, for which latter reason it is provided with a lug $a$ constituting, in effect, a binding post. Within the cell or shell A one or more electrodes B are disposed (three being shown in the drawings), and insulated from the bottom thereof, preferably by means of small buttons $b$. When a series of electrodes B are employed (as will usually be the practice), they are, of course, insulated from each other by means of asbestos or any other suitable insulating material. The shell of each electrode B is made of a single imperforate piece of sheet iron, preferably corrugated to afford an extended surface. In constructing the shell of an electrode B I may take a piece of sheet iron and cut it to form the blank shown in Fig. 3,—viz.—having parts 1, 1, flanges 2 at the longitudinal edges of the parts 1, ears 3 between the parts 1, 1, ears 4 at the free ends of one or both parts 1, 1, a lug or binding post 5 projecting from one of the parts 1 and a tongue $5^a$ on binding post 5. The blank may then be corrugated (with the exception of the lug 5), or, if desired, the sheet iron may be corrugated before the blank is cut. In forming the electrode shell, the blank will be bent upon itself to form the sides and bottom of the hollow electrode and the flanges will be bent toward each other (preferably overlapping), to form the edge walls of the box. The ears 3, 4, will be bent over and serve to brace the structure said cover being preferably of insulating material.

In Fig. 2 I have shown three hollow electrodes B bound together with insulating material B⁵ (preferably asbestos) between them, the central box or electrode representing the positive and the outer boxes or electrodes representing the negative side of the battery. In the drawing, the negative electrodes are shown electrically connected together by means of their lugs 5 and if it is desired that the containing device or cell A shall also form a negative electrode, it is connected with the negative electrode within the cell. It is evident that the shell or cell A may be made to form a positive electrode by connecting it in multiple with the positive instead of the negative electrode within the cell. The tongues 5ª are bent down on cover A¹ of the cell.

The electrode shells B are adapted to contain and inclose the active material C (which may be red lead, or similar material) so as to obviate any possibility of the falling off or escape of the latter, said active material being, in effect, the electrode *per se* and the shell B being a container or receptacle therefor which will not be chemically affected by an alkaline electrolyte. The electrode shells B are of such length or height as to terminate below the upper end of the cell A so that the electrolyte D within the cell can readily reach the active material or electrode *per se* through the upper open end of the box or hollow electrode shell. I prefer to use, as the active material, red lead, although some other active material might be used and for the electrolyte I prefer to use an alkaline solution.

An electrode shell constructed of thin, corrugated sheet iron, in the form of a box, has been found, by actual experiment, to be very valuable in the construction of secondary batteries for various reasons, among which may be mentioned; its lightness as compared with lead; its stability, stiffness and durability; its capability of holding the active material so as to prevent the latter from possible escape; its strength in withstanding pressure which might be exerted by the expansion of the active material, and its general efficiency as an electrode shell or holder for active material.

While I have above described my improved electrode shell B, as rectangular or in the form of a flat box of thin corrugated sheet iron, it may, if desired, be made annular in form as shown in Figs. 4 and 5. In these figures, a series of shells B¹, B², B³, B⁴ are shown, and are connected together in pairs at their lower edges so as to form two annular boxes for containing the active material.

I have herein described an electrode shell which is not affected chemically by the alkaline electrolyte, and active material contained within said shell, and constituting the active part of the electrode.

The spirit of my invention is to make a receptacle or inclosing shell of iron or steel or metal which shall be neutral in the electrolyte or upon which the electrolyte shall have no wasting or destroying action. With an alkaline electrolyte, iron or steel fulfils this condition. Thus the iron or steel shell of the electrode is neutral and is not acted upon chemically but it does however perform the function of a conductor and also receives on its surface, deposits of metallic lead (on the negative plate) and peroxid (on the positive plate). It requires both the active material, (in this case oxid of lead) which forms the active part of the electrode which is chemically acted upon by the electrolyte, and the iron or steel as a receptacle or inclosing shell which cannot be destroyed in an alkaline electrolyte, to constitute the complete electrode. The actions and reactions of my battery can be explained in the same general way as in all storage batteries,—viz. In charging, lead is deposited at the negative electrode (which also takes or absorbs hydrogen) while oxygen is taken by the positive electrode and its active material oxidized or formed into a higher oxid. During discharge, the lead is redissolved combining again with the oxygen from the positive electrode.

Various other changes in details of construction might be made without departing from the spirit of my invention or limiting its scope; the cell and electrodes being made of thin sheet metal, they can be readily bent or formed into any desired shape to accommodate the battery to the place or position where it is to be operated, and I do not desire to limit myself to the precise details herein set forth.

Having fully described my invention what I claim as new and desire to secure by Letters-Patent is:—

1. A storage battery comprising a container of corrugated sheet iron, an electrode shell therein of corrugated sheet iron, an electrolyte having no chemical effect on said container and electrode shell, and active material in said shell.

2. A storage battery comprising a sheet iron, corrugated receptacle adapted to constitute a terminal of the battery, an electrolyte contained within said receptacle, hollow electrode shells made of imperforate sheet iron immersed in said electrolyte, and active material contained within said hollow electrode shells, substantially as set forth.

3. A blank for a hollow electrode for a storage battery, consisting of a single piece of sheet iron adapted to be bent upon itself and having lateral flanges to constitute edge walls of the hollow electrode, said blank also having a lug or binding post at one end, and a tongue projecting from said lug or binding post and adapted to assist in supporting the electrode, substantially as set forth.

4. An electrode for a storage battery consisting of a piece of sheet metal bent to form a box to contain electrolyte and having a lug or binding post projecting therefrom and a tongue projecting from said lug or binding post, substantially as set forth.

In testimony whereof, I have signed this specification in the presence of two subscribing witnesses.

WILLIAM L. MERRIN.

Witnesses:
   VICTOR A. MERRIN,
   JAMES G. ROCKS.